US009888441B2

(12) United States Patent
Liang et al.

(10) Patent No.: US 9,888,441 B2
(45) Date of Patent: Feb. 6, 2018

(54) METHOD AND SYSTEM FOR MANAGING POWER USAGE OF A MOBILE TERMINAL

(71) Applicant: Cheetah Mobile Inc., Grand Cayman (KY)

(72) Inventors: Xin Liang, Beijing (CN); Shanshan Wang, Beijing (CN); Sheng Fu, Beijing (CN); Ming Xu, Beijing (CN)

(73) Assignee: CHEETAH MOBILE INC., Grand Cayman (KY)

( * ) Notice: Subject to any disclaimer, the term of this patent is extended or adjusted under 35 U.S.C. 154(b) by 32 days.

(21) Appl. No.: 14/586,624

(22) Filed: Dec. 30, 2014

(65) Prior Publication Data

US 2015/0189594 A1    Jul. 2, 2015

(30) Foreign Application Priority Data

Dec. 31, 2013  (CN) .......................... 2013 1 0752898

(51) Int. Cl.
*H04W 52/02*     (2009.01)
(52) U.S. Cl.
CPC ......... *H04W 52/0225* (2013.01); *Y02B 60/50* (2013.01)
(58) Field of Classification Search
CPC ......... H04W 52/0254; H04W 52/0225; H04W 52/0261; H04W 52/0251; H04W 52/027; H04W 52/0277; H04W 52/0235; H04W 52/0248; H04W 52/0264
See application file for complete search history.

(56) References Cited

U.S. PATENT DOCUMENTS

| | | | | |
|---|---|---|---|---|
| 8,958,854 B1* | 2/2015 | Morley | ..................... | H04B 1/38 370/311 |
| 2005/0085277 A1* | 4/2005 | Chen | ..................... | G06F 1/3215 455/572 |
| 2010/0146312 A1* | 6/2010 | Liao | ..................... | G06F 1/3203 713/310 |
| 2010/0231383 A1* | 9/2010 | Levine | ............... | H04W 52/0261 340/540 |
| 2013/0273964 A1* | 10/2013 | Patino | ............... | H04W 52/0277 455/552.1 |
| 2014/0194086 A1* | 7/2014 | Alam | ................ | H04W 52/0254 455/405 |

* cited by examiner

*Primary Examiner* — Devan Sandiford
(74) *Attorney, Agent, or Firm* — Morgan, Lewis & Bockius LLP

(57) ABSTRACT

A method for managing power usage is perform at a mobile terminal having one or more processors and memory storing programs executed by the one or more processors. The mobile terminal collects its operating environment information while the mobile terminal is in a first operating mode. The mobile terminal compares the collected operating environment information with a plurality of power usage switch conditions, each power usage switch condition having an associated operating mode, to determine whether the collected operating environment information matches one of the plurality of power usage switch conditions. When this happens, the mobile terminal determines its current working status and switches from the first operating mode to the second operating mode when there is no conflict between the mobile terminal's current working status and the second operating mode associated with the matched power usage switch condition.

23 Claims, 6 Drawing Sheets

METHOD AND SYSTEM FOR MANAGING POWER USAGE OF A MOBILE TERMINAL

RELATED APPLICATION

This application claims priority to Chinese Patent Application No. 201310752898.3, entitled "METHOD, DEVICE AND MOBILE TERMINAL FOR MANAGING POWER USAGE" filed on Dec. 31, 2013, which is incorporated by reference in its entirety.

TECHNICAL FIELD

This application relates generally to mobile applications and in particular to method and system for managing power usage of a mobile terminal.

BACKGROUND

As a mobile terminal's hardware (e.g., CPU speed, memory capacity, and screen size) and software both improve, the power usage issue is becoming more and more eminent. Conventional power-saving approaches include manual switches for adjusting a mobile terminal's certain functions, such as screen brightness and audio volume, etc. These approaches are cumbersome because the user of the mobile terminal has to be involved before any decision is made.

SUMMARY

The present application describes methods and systems for managing power usage of a mobile terminal. As stated above in the background, mobile terminals are widely used in today's world and power saving is always necessary regardless of a battery's capacity. Approaches described in the present application are more convenient and efficient than conventional approaches by automatically adjusting the power usage of a mobile terminal based on various operating conditions.

In accordance with some embodiments, a method of managing power usage of a mobile terminal is performed at a mobile terminal having one or more processors and memory storing programs executed by the one or more processors. The method includes: collecting the mobile terminal's operating environment information while the mobile terminal is in a first operating mode; comparing the collected operating environment information with a plurality of power usage switch conditions, each power usage switch condition having an associated operating mode; when the collected operating environment information matches one of the plurality of power usage switch conditions, determining the mobile terminal's current working status; and when there is no conflict between the mobile terminal's current working status and a second operating mode associated with the matched power usage switch condition, causing the mobile terminal to switch from the first operating mode to the second operating mode.

In accordance with some embodiments, a mobile terminal includes one or more processors, memory, and one or more programs; the one or more programs are stored in the memory and configured to be executed by the one or more processors and the one or more programs include instructions for performing the operations of the method described above. In accordance with some embodiments, a non-transitory computer readable storage medium has stored therein instructions which, when executed by the mobile terminal, cause the device to perform the operations of the method described above.

Thus, mobile terminals with touch screens are provided with faster, more efficient and intuitive methods and interfaces for manipulating user interface objects, thereby increasing the convenience, efficiency, and user satisfaction when using such devices. Such methods and interfaces may complement or replace conventional methods for manipulating user interface objects.

BRIEF DESCRIPTION OF THE DRAWINGS

For a better understanding of the aforementioned embodiments of the invention as well as additional embodiments thereof, reference should be made to the Description of Embodiments below, in conjunction with the following drawings in which like reference numerals refer to corresponding parts throughout the figures.

DESCRIPTION OF EMBODIMENTS

Figure 1:
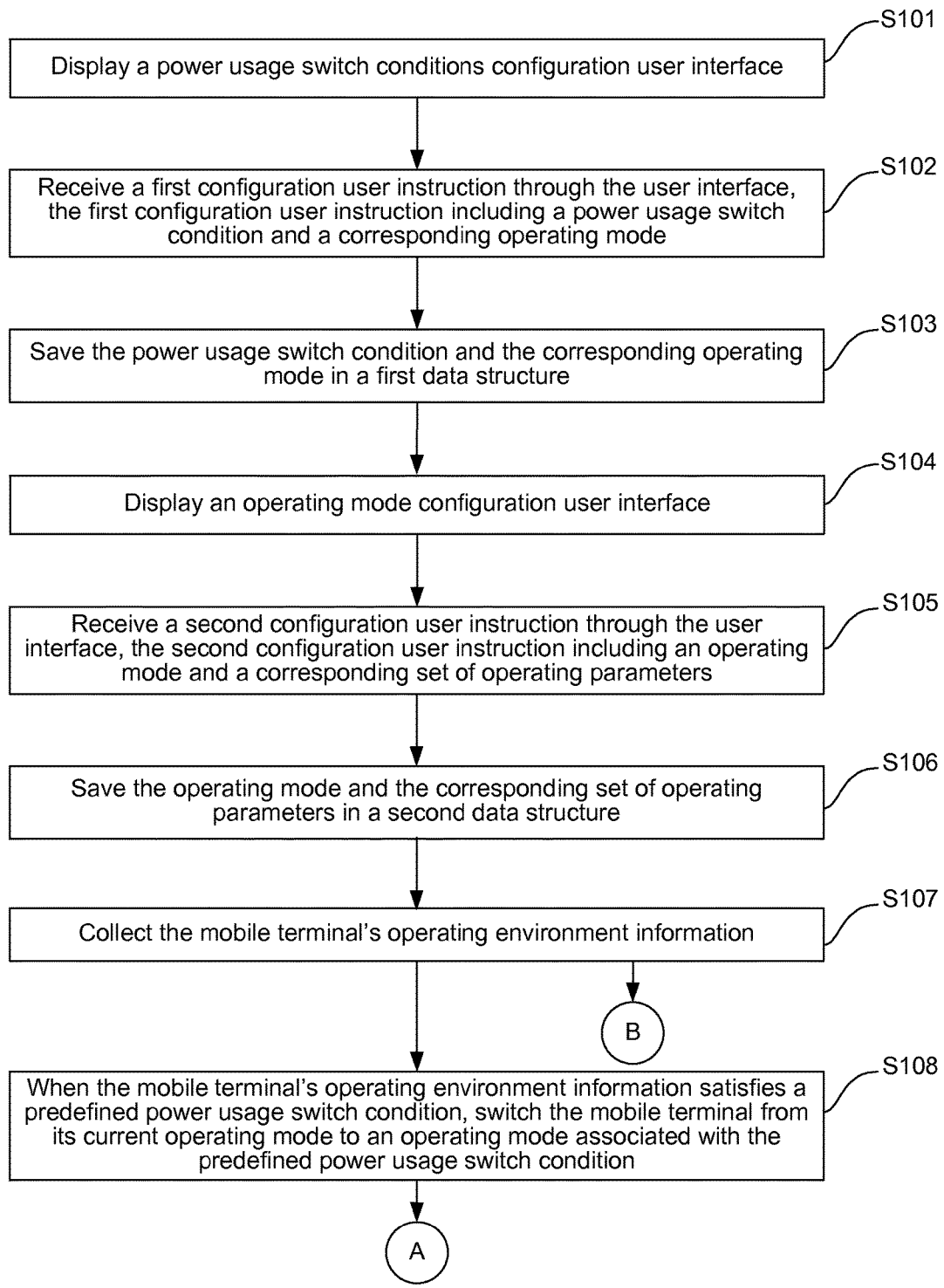
FIG. 1 is a flow diagram illustrating how a mobile terminal manages power usage in accordance with some embodiments.

Reference will now be made in detail to embodiments, examples of which are illustrated in the accompanying drawings. In the following detailed description, numerous specific details are set forth in order to provide a thorough understanding of the present application. However, it will be apparent to one of ordinary skill in the art that the present application may be practiced without these specific details. In other instances, well-known methods, procedures, components, circuits, and networks have not been described in detail so as not to unnecessarily obscure aspects of the embodiments. It should be noted that embodiments of the present application apply to mobile terminals using different operating systems, including iOS, Android, and Windows Phone. Such mobile terminals include smartphones, tablets, personal digital assistants, and electronic books.

As noted above, conventional approaches of managing power usage of a mobile terminal is neither efficient nor user-friendly. According to some embodiments, the present application is directed to a method of managing power usage of a mobile terminal in a more efficient manner. This method includes a step of collecting the mobile terminal's operating environment information. More specifically, the mobile terminal's operating environment information includes at least one of a current timestamp (e.g., the OS's timestamp), a current location (e.g., based on the output of the GPS module in the mobile terminal), a current network signal strength (e.g., the Wi-Fi or cellular wireless signal detected by the mobile terminal), and a current battery power level or a power charge indicator of the mobile terminal. When the mobile terminal's operating environment information satisfies a predefined power usage switch condition, the method includes a step of switching the mobile terminal from its current operating mode to an operating mode associated with the predefined power usage switch condition. In some embodiments, an operating mode has an associated set of operating parameters. The switch from a first operating mode to a second operating mode requires the comparison of the two sets of operating parameters such that the operating parameters associated with the first operating mode are replaced by the operating parameters associated with the second operating mode when they are different. Typical operating parameters include at least one of brightness, audio signal volume, timeout, cellular wireless data connection, Wi-Fi connection, Bluetooth connection, GPS on/off switch, airplane mode on/off switch, and vibration on/off switch of the mobile terminal.

For example, when the mobile terminal's operating environment information is the current timestamp of the mobile terminal and the current timestamp is within a predefined range (e.g., 23:00 PM-7:00 AM), the mobile terminal is switched to a first operating mode, e.g., the night operating mode in which both the Wi-Fi and Bluetooth connections are turned off and the airplane mode is on and the brightness of the screen is set to a dim level to conserve power usage. Similarly, the mobile terminal is switched to a corresponding operating mode when the mobile terminal's operating environment information satisfies other predefined power usage switch condition that may be dependent on the current location of the mobile terminal, the current battery power level of the mobile terminal, the current signal strength of the mobile terminal, etc.

In some embodiments, before switching from a first operating mode to a second operating mode, the mobile terminal determines the mobile terminal's current working status in order to determine whether there is a conflict between the mobile terminal's current working status and the second operating mode. For example, when the mobile terminal is in the middle of a telephone conversation, the mobile terminal should not be switched to an operating mode that requires the airplane mode be turned on. In this case, the mobile terminal compares its current working status with the operating parameters associated with the second operating mode to find out whether there is any conflict between the two. If so, the mobile terminal gives priority to the current working status and defers the switch until a predefined change to the current working status that eliminates the conflict between the two. In some embodiments, the mobile terminal may defer the switch for a predefined period of time (e.g., 2-5 minutes) and revisit the current working status to determine whether the telephone is still in the middle of a telephone conversation and repeat such step until the telephone conversation is completed before switching from the first operating mode to the second operating mode.

It should be noted that a power usage switch condition has a corresponding operating mode and the operating mode has a corresponding set of operating parameters. Both mapping relationships are stored in and managed by a corresponding data structure in the memory of the mobile terminal. Certain user interfaces are provided so that a user of the mobile terminal can manage such mapping relationships through such user interfaces.

FIG. 1 is a flow diagram illustrating how a mobile terminal manages power usage in accordance with some embodiments.

Figure 7B:
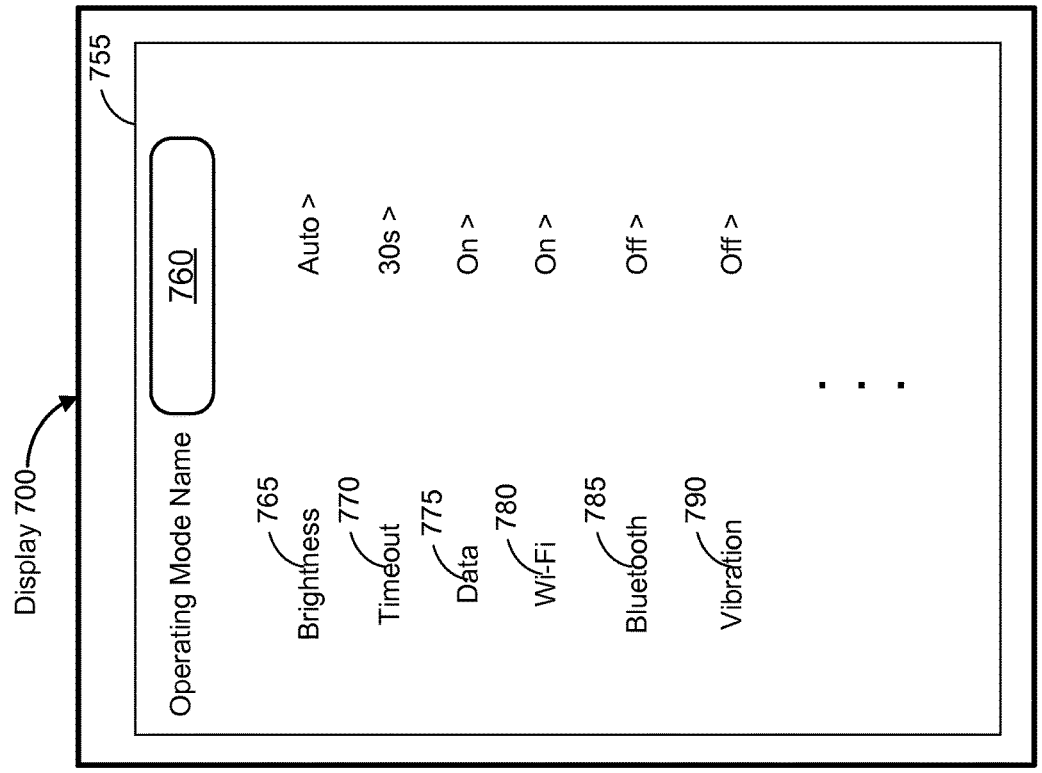
FIGS. 7A and 7B are exemplary user interfaces displayed on the mobile terminal in accordance with some embodiments.
Figure 7A:
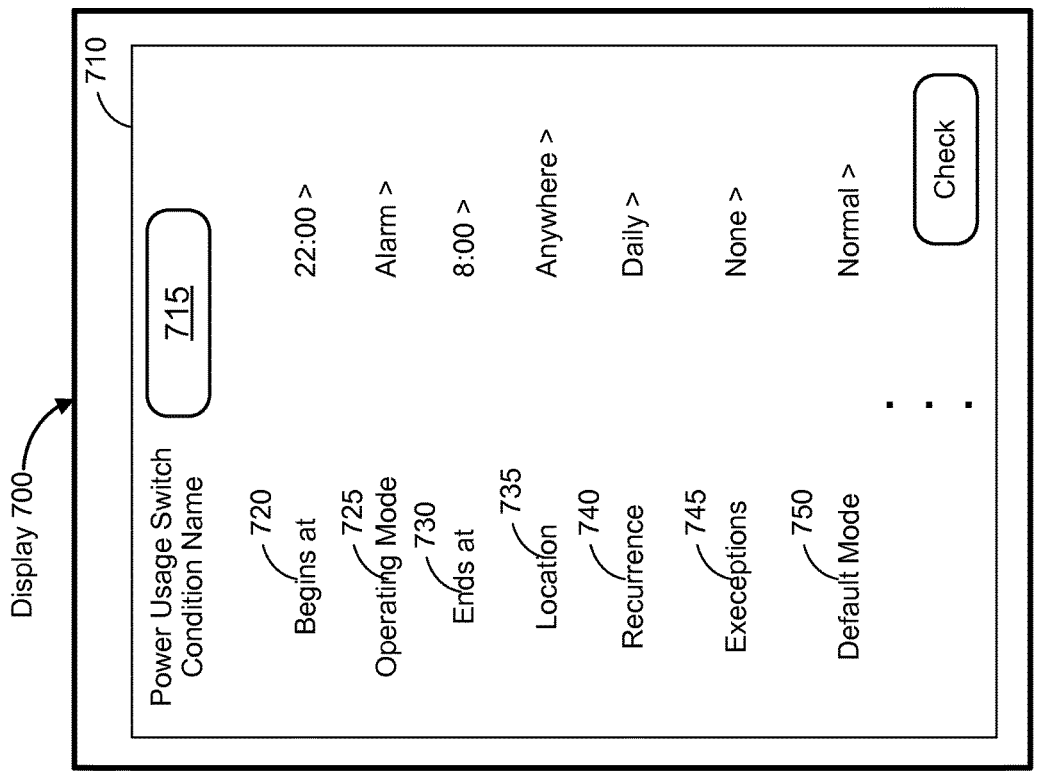

At S101, the mobile terminal displays a power usage switch conditions configuration user interface. FIG. 7A depicts an exemplary power usage switch conditions configuration user interface 710 on the display 700 of a mobile terminal. In this example, the user can define the begin time 720, the operating mode 725 to be switched on, the end time 730, the location scope 735, and the recurrence 740 for a particular power usage switch condition through the user interface. In some embodiments, the user can further define the exceptions 745 to the particular power usage switch condition and the corresponding default operating mode 750 when any of such exceptions occurs. Note that the ">" sign behind a parameter is user-selectable through which the user can choose a value accordingly. For example, one exception is that the cellular wireless connection should be kept on when the mobile terminal's web browser application is actively running (e.g., when the user is currently browsing a website). It should noted that the default mode may be the current operating mode before such switch would occur or another operating mode that is more energy-efficient than the current operating mode but without causing any conflict with the mobile terminal's current working status.

At S102, the mobile terminal receives a first configuration user instruction through the user interface, the first configuration user instruction including a power usage switch condition and a corresponding operating mode. As noted above in connection with FIG. 7A, the user of the mobile terminal can define a power usage switch condition and its associated operating mode(s) based on the user's personal needs. Such switch condition may be associated with the current time/location, the current battery power level, the current signal strength, etc. For example, when the mobile terminal has been located in a remote region (e.g., based on the output of the GPS module or the strength of the cellular wireless signal) for at least a predefined period of time (e.g., 15 minutes), the mobile terminal may switch to an operating mode that is customized for such environment to conserve more battery power. This may happen when the user is driving in a car within a national park that has low signal coverage and it is more likely that the user is not going to use the mobile terminal for an extend period of time. In this case, saving more power is often desired.

Since the user may specify multiple power usage switch conditions and their associated parameters using the user interface, there may be conflicts between different user-defined power usage switch conditions. As an optimization step before saving the user-defined power usage switch condition, the user interface 710 includes a "Check" button that triggers the mobile terminal to determine whether there is a conflict between the current power usage switch condition and the corresponding operating mode and any pre-existing power usage switch conditions and their corresponding operating modes stored in the first data structure. If so, the mobile terminal may generate and display an alert indicating the conflict. In response, the user can modify the parameters associated with different power usage switch conditions to resolve the conflict. In some embodiments, the user may choose to override the pre-existing power usage switch conditions with the new one when such conflict occurs.

At S103, the mobile terminal saves the power usage switch condition and the corresponding operating mode in a first data structure stored in the memory of the mobile terminal. Table 1 below includes a list of power usage switch conditions based on the current time of the mobile terminal.

| ID | Begin Time | Operating Mode | End Time | Subsequent Operating Mode | Recurrence Rule |
|----|------------|----------------|----------|---------------------------|-----------------|
| 1  | 22:00      | Alarm          | 7:00     | Normal                    | A[6]            |
| 2  | 12:00      | Power-Saving   | 14:00    | Normal                    | B[6]            |
| 3  | 8:00       | Commute        | 10:00    | Power-Saving              | C[6]            |

The subsequent operating mode may be same as the default operating mode as described above in connection with FIG. 7A. Note that the recurrence rule may be stored in an array having a predefined length based on its frequency (e.g., 1, 7, 12, 30, 365, etc.). Table 2 includes a weekly recurrence rule.

| A[0] | A[1] | A[2] | A[3] | A[4] | A[5] | A[6] |
|------|------|------|------|------|------|------|
| 1    | 1    | 1    | 1    | 1    | 0    | 0    |

In this table, "1" represents that the power usage switch condition applies to that day and "0" represents that the power usage switch condition does not apply to that day. As noted above, there may be conflicts between different power usage switch conditions. The mobile terminal, regularly or irregularly, compares them to identify those conflicts and brings them to the user's attention for resolution. As a default rule, the most recent power usage switch condition should have priority over the earlier ones.

As noted above, there are two mapping relationships, one between power usage switch conditions and operating modes and another one between the operating modes and operating parameters. Such operating parameters control the mobile terminal's operation at a particular operating mode in connection with a predefined power usage switch condition. At S104, the mobile terminal displays an operating mode configuration user interface through the user can specify the operating parameters associated with a particular operating mode. FIG. 7B depicts an exemplary operating mode configuration user interface 755 on the display 700 of a mobile terminal. In this example, the user can define the brightness 765, the timeout 770, the data connection 775, the Wi-Fi connection 780, the Bluetooth connection 785, and the vibration 790 for a particular operating mode through the user interface. For example, for the night operating mode, the mobile terminal may turn on the airplane mode and turn off the Wi-Fi and Bluetooth connections and minimizes the brightness and audio volume. At S105, the mobile terminal receives a second configuration user instruction through the user interface, the second configuration user instruction including an operating mode and a corresponding set of operating parameters. It should be noted that the two user interfaces may be combined into one interface and the sequence of user input may be reversed such that the mobile terminal first generates operating modes based on user input and then generates power usage switch conditions based on user input.

At S106, the mobile terminal saves the operating mode and the corresponding set of operating parameters in a second data structure. Table 3 includes a list of exemplary operating modes and their associated set of operating parameters.

| Mode ID | Operating Mode | Wi-Fi | Data | Brightness | Audio Volume | Airplane Mode |
|---------|----------------|-------|------|------------|--------------|---------------|
| 1       | Normal         | 1     | 1    | 50%        | 100%         | 0             |
| 2       | Power-Saving   | 0     | 0    | 30%        | 100%         | 0             |
| 3       | Alarm          | 0     | 0    | 0%         | 0%           | 1             |

At S107, the mobile terminal collects the mobile terminal's operating environment information. As noted above, the operating environment information includes the time, location, battery power level, signal strength, power charge indicator, current working status of different applications running in the mobile terminal. At S108, the mobile terminal switches the mobile terminal from its current operating mode to an operating mode associated with the predefined power usage switch condition when the mobile terminal's operating environment information satisfies a predefined power usage switch condition.

Figure 2:
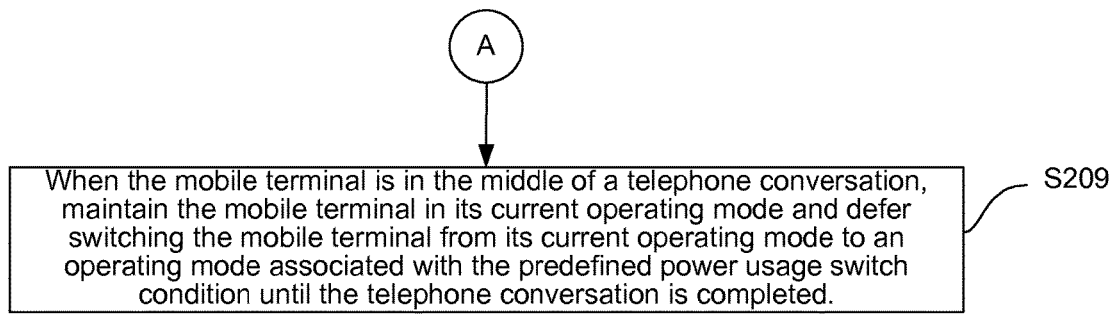
FIG. 2 is a flow diagram illustrating how the mobile terminal manages power usage in the middle of a telephone conversation in accordance with some embodiments.

FIG. 2 is a flow diagram illustrating how the mobile terminal manages power usage in the middle of a telephone conversation in accordance with some embodiments. As noted above, the mobile terminal's current working status may conflict with a power usage switch condition. For example, when the mobile terminal is in the middle of a telephone conversation, the airplane mode should not be turned on. At S209, the mobile terminal maintains its current operating mode and defers switching from its current operating mode to an operating mode associated with the predefined power usage switch condition until the telephone conversation is completed. For example, the mobile terminal may start a timer for a predefined period of time (e.g., 1 minute) and check whether the telephone conversation is terminated or not at the end of the time period. Similarly, when the user is using the mobile terminal to transmit data, the mobile terminal should defer switching to an operating mode that turns off the data connection of the mobile terminal.

Figure 3:
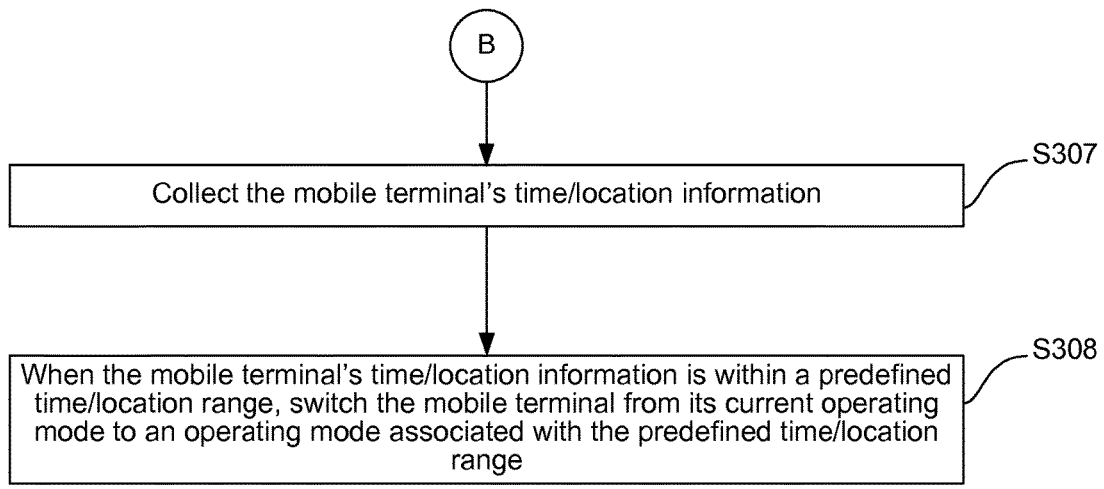
FIG. 3 is a flow diagram illustrating how the mobile terminal manages power usage based on its current time/location information in accordance with some embodiments.
Figure 6:
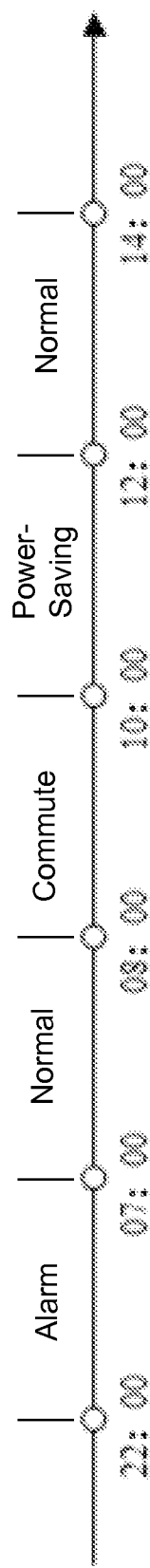
FIG. 6 is a block diagram illustrating how a mobile terminal implements multiple operating modes along a timeline in accordance with some embodiments.

FIG. 3 is a flow diagram illustrating how the mobile terminal manages power usage based on its current time/location information in accordance with some embodiments. As noted above, the mobile terminal may use the current time/location information to switch between different operating modes. At S307, the mobile terminal collects the mobile terminal's time/location information. At S308, the mobile terminal switches from its current operating mode to an operating mode associated with the predefined time/location range when the mobile terminal's time/location information is within a predefined time/location range. FIG. 6 is a block diagram illustrating how a mobile terminal implements multiple operating modes along a timeline in accordance with some embodiments. In this example, it is assumed that the power usage switch conditions listed in Table 1 above are implemented. But it will be apparent to one skilled in the art that the same approach can be applied to other power usage switch conditions. For example, if the power usage switch condition is based on the current battery power level, the mobile terminal automatically enters the power-saving mode when its current battery power level is less than 20%. However, such power saving mode may be replaced by the normal mode when the mobile terminal is connected to a power source to be recharged. When the power charge is terminate, the mobile terminal checks its current battery power level to determine whether it should return to the power-saving mode or not.

In another example, the mobile terminal checks its signal strength and then determines an operating mode accordingly. For example, when the Wi-Fi signal strength is below a predefined threshold level, the mobile terminal may turn off the Wi-Fi connection for a predefined period of time (assuming that the mobile terminal is not in the middle of a data exchange with the network). After the predefined period of time (e.g., 15 minutes), the mobile terminal checks the Wi-Fi signal strength again and acts accordingly. In some embodiments, the power-saving mode turns on the Wi-Fi connection for a short period of time (e.g., one minute) for every 15 minutes so as to retrieve data accumulated during this 15 minutes from the network.

Figure 4:
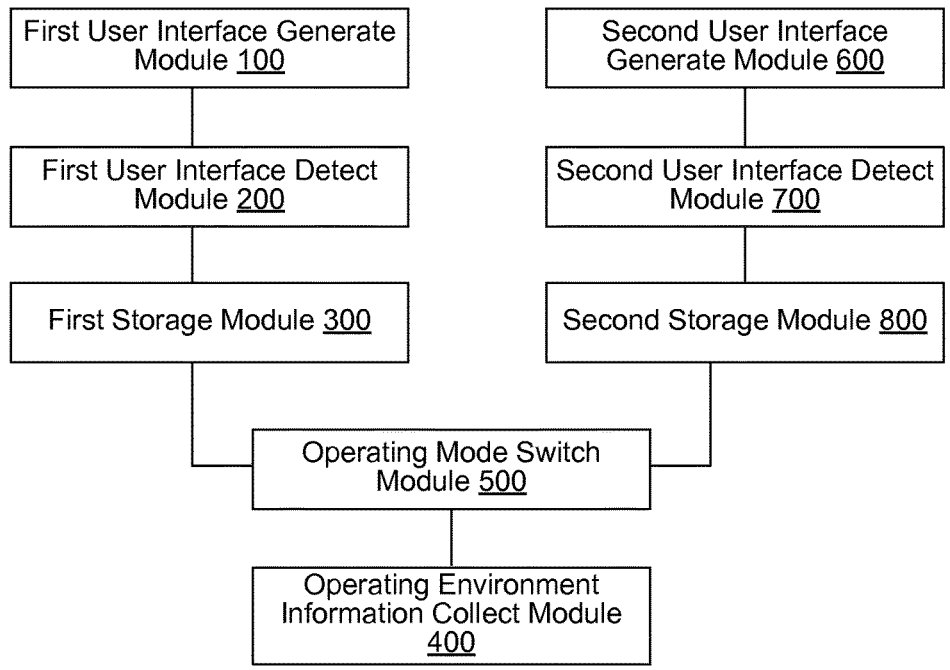
FIG. 4 is a block diagram illustrating structural components of a mobile terminal in accordance with some embodiments.

FIG. 4 is a block diagram illustrating structural components of a mobile terminal in accordance with some embodiments. The operating environment information collect module 400 is responsible for collecting the operating environment information as described above periodically. The operating mode switch module 500 is responsible for comparing the collected the operating environment information with predefined power usage switch conditions and switching the mobile terminal from a first operating mode to a second operating mode accordingly. In this example, the first user interface generate model 100 is responsible for generating and displaying a power usage switch condition configuration user interface. The first user interface detect module 200 is responsible for receiving a first configuration user instruction through the user interface, the first configuration user instruction including a power usage switch condition and a corresponding operating mode. The first storage module 300 is responsible for saving the power usage switch condition and the corresponding operating mode in a first data structure in the memory. The second user interface generate model 600 is responsible for generating and displaying an operating mode configuration user interface. The second user interface detect module 700 is responsible for receiving a second configuration user instruction through the user interface, the second configuration user instruction including an operating mode and a corresponding set of operating parameters. The second storage module 800 is responsible for saving the operating mode and the corresponding set of operating parameters in a second data structure.

Figure 5:
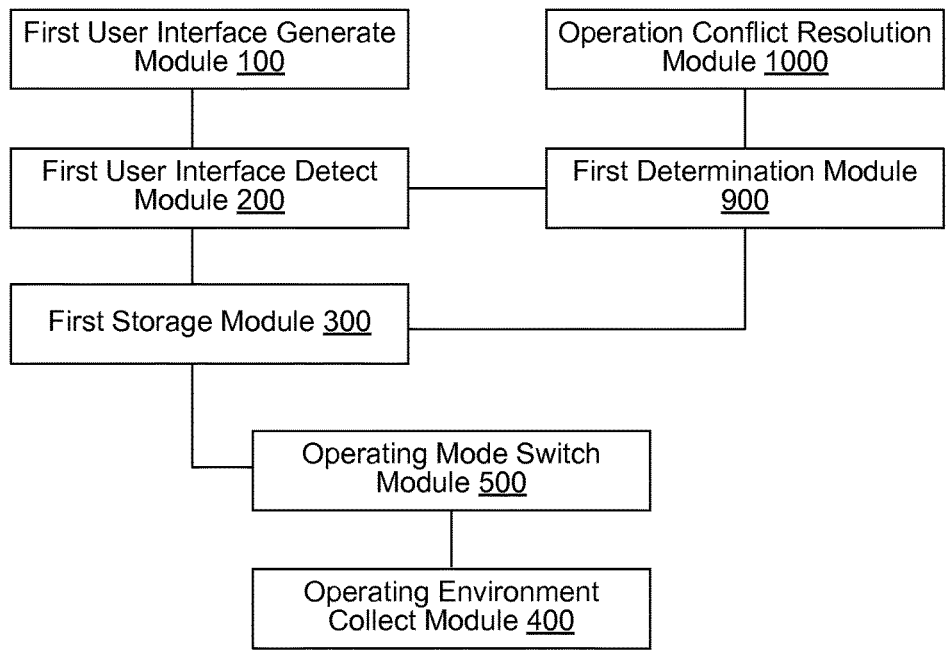
FIG. 5 is another block diagram illustrating structural components of a mobile terminal in accordance with some embodiments.

FIG. 5 is another block diagram illustrating structural components of a mobile terminal in accordance with some embodiments. In this example, the first determination module 900 is responsible for determining whether there is a conflict between the power usage switch condition and the corresponding operating mode (provided by the first user interface detect module 200) and pre-existing power usage switch conditions and their corresponding operating modes stored in the first data structure (provided by the first storage module 300). The operation conflict resolution module 1000 is responsible for generating and displaying an alert indicating the conflict when such conflict exists and applying the user's instruction on how to resolve the conflicts.

Figure 8:
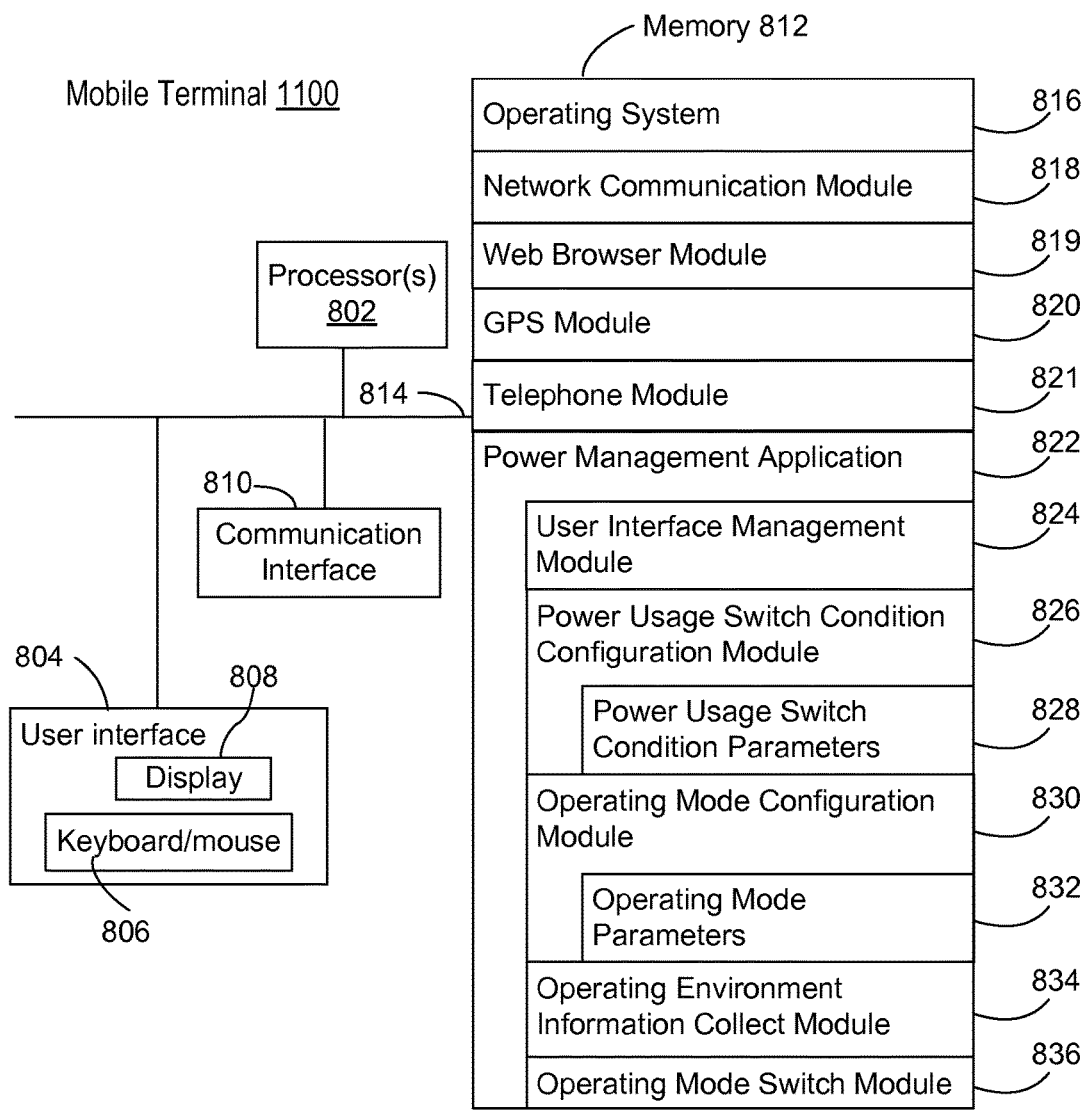
FIG. 8 is a block diagram of exemplary components of a mobile terminal in accordance with some embodiments Like reference numerals refer to corresponding parts throughout the several views of the drawings.

FIG. 8 is a block diagram of exemplary components of a mobile terminal 1100 in accordance with some embodiments. The mobile terminal 1100 includes one or more processors 802 for executing modules, programs and/or instructions stored in memory 812 and thereby performing predefined operations; one or more network or other communications interfaces 810; memory 812; and one or more communication buses 814 for interconnecting these components or interconnecting the mobile terminal 1100 with another device (e.g., a remote server or another mobile terminal). In some embodiments, the mobile terminal 1100 includes a user interface 804 comprising a display device 808 and one or more input devices 806 (e.g., keyboard or mouse or a touchscreen as shown in FIGS. 7A and 7B).

In some embodiments, the memory 812 includes high-speed random access memory, such as DRAM, SRAM, DDR RAM or other random access solid state memory devices. In some embodiments, the memory 812 includes non-volatile memory, such as one or more magnetic disk storage devices, optical disk storage devices, flash memory devices, or other non-volatile solid state storage devices. In some embodiments, the memory 812 includes one or more storage devices remotely located from the processor(s) 802. Memory 812, or alternately one or more storage devices (e.g., one or more nonvolatile storage devices) within the memory 812, includes a non-transitory computer readable storage medium. In some embodiments, the memory 812 or the computer readable storage medium of the memory 812 stores the following programs, modules and data structures, or a subset thereof:

- an operating system 816 that includes procedures for handling various basic system services and for performing hardware dependent tasks;
- a network communications module 818 that is used for connecting the mobile terminal 1100 to other computers (e.g., a remote server) via the communication network interfaces 810 and one or more communication networks (wired or wireless), such as the Internet, other wide area networks, local area networks (Bluetooth or Wi-Fi), metropolitan area networks, NFC, acoustic fingerprint, etc.;
- a web browser module 819 for browsing the Internet by downloading and uploading data between the mobile terminal and the Internet;
- a global positioning system (GPS) module 820 for determining the current location of the mobile terminal 1100;
- a telephone module 821 for performing telephone related operations using the mobile terminal 1100;
- a power management application 822 for managing the power usage of the mobile terminal 1100 as described above; in some embodiments, the power management application 822 further includes:
  - a user interface management module 824 for generating and displaying user interfaces and receiving user inputs as described above;
  - a power usage switch condition configuration module 826 for generating and updating user-defined power usage switch conditions through the user interface management module 824 as described above; in some embodiments, the power usage switch condition configuration module 826 stores a plurality of power usage switch condition parameters 828 as depicted in Table 1 above;
  - an operating mode configuration module 830 for generating and updating user-defined operating modes through the user interface management module 824 as described above; in some embodiments, the operating mode configuration module 830 stores a plurality of operating mode parameters 832 as depicted in Table 3 above;
  - an operating environment information collect module 834 for collecting the mobile terminal 1100's current environment information as well as its working status as described above; and an operating mode switch module 836 for switching the mobile terminal from a first operating mode to a second operating mode when the mobile terminal 1100's current environment information satisfies one of the predefined power usage switch conditions as described above.

While particular embodiments are described above, it will also be understood that, although the terms first, second, etc. may be used herein to describe various elements, these elements should not be limited by these terms. These terms are only used to distinguish one element from another. For example, a first contact could be termed a second contact, and, similarly, a second contact could be termed a first contact, without departing from the scope of the present application. The first contact and the second contact are both contacts, but they are not the same contact.

The terminology used in the description of the invention herein is for the purpose of describing particular embodiments only and is not intended to be limiting of the invention. As used in the description of the invention and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

Although some of the various drawings illustrate a number of logical stages in a particular order, stages that are not order dependent may be reordered and other stages may be combined or broken out. While some reordering or other groupings are specifically mentioned, others will be obvious to those of ordinary skill in the art and so do not present an exhaustive list of alternatives. Moreover, it should be recognized that the stages could be implemented in hardware, firmware, software or any combination thereof.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

What is claimed is:

1. A method for managing power usage of a mobile terminal, the method comprising:
at the mobile terminal having one or more processors and memory storing programs executed by the one or more processors;
displaying a power usage switch condition configuration user interface;
predefining, according to configuration inputs by the user, a plurality of power usage switch conditions and respectively associated operating modes, including:
for a respective power usage switching condition, predefining a time criterion for switching to the respective power usage switching condition in accordance with the configuration inputs from the user; and
performing a user initiated conflict check on the respective power usage switching condition and a corresponding operating mode thereof against one or more pre-existing power usage switching conditions and corresponding operating modes thereof;
collecting operating environment information of the mobile terminal while the mobile terminal is in a first operating mode;
comparing the collected operating environment information with a plurality of power usage switch conditions, each power usage switch condition having an associated operating mode;
in accordance with a determination that the collected operating environment information matches one of the plurality of power usage switch conditions, determining a current working status of the mobile terminal;
in accordance with a determination that there is no conflict between the current working status of the mobile terminal and a second operating mode associated with the matched power usage switch condition, causing the mobile terminal to switch from the first operating mode to the second operating mode; and
in accordance with a determination that the current working status of the mobile terminal satisfies a predetermined exception for the matched power usage switch condition, operating the mobile terminal using a default mode that is predefined by a user and that is different from the first operating mode and the second operating mode.

2. The method of claim 1, further comprising:
receiving a first configuration user instruction through the user interface, the first configuration user instruction specifying a start time and an end time for a respective power usage switch condition and a corresponding operating mode; and
saving the power usage switch condition and the corresponding operating mode in a first data structure in the memory.

3. The method of claim 2, further comprising:
before saving the power usage switch condition and the corresponding operating mode:
determining whether there is a conflict between the power usage switch condition and the corresponding operating mode and pre-existing power usage switch conditions and their corresponding operating modes stored in the first data structure; and
generating and displaying an alert indicating the conflict when such conflict exists.

4. The method of claim 2, wherein the power usage switch condition specifies at least one of a time range, a location range, a frequency, and the exception for activating the corresponding operating mode.

5. The method of claim 2, further comprising:
receiving a user instruction for predefining the default mode and the predetermined exception corresponding to the default mode.

6. The method of claim 1, further comprising:
displaying an operating mode configuration user interface;
receiving a second configuration user instruction through the user interface, the second configuration user instruction including an operating mode and a corresponding set of operating parameters; and
saving the operating mode and the corresponding set of operating parameters in a second data structure.

7. The method of claim 6, wherein the corresponding set of operating parameters includes at least one of brightness, timeout, cellular wireless data connection, Wi-Fi connection, Bluetooth connection, and vibration of the mobile terminal.

8. The method of claim 1, wherein the mobile terminal's operating environment information includes at least one of a current timestamp, a current location, a current network signal strength, and a current battery power level of the mobile terminal.

9. The method of claim 1, wherein the mobile terminal's current working status indicates one or more application modules currently running on the mobile terminal.

10. The method of claim 1, further comprising:
when there is a conflict between the mobile terminal's current working status and the second operating mode, deferring the switch from the first operating mode to the second operating mode until after detecting a predefined change to the mobile terminal's current working status.

11. The method of claim 10, wherein there is a conflict when the mobile terminal is in the middle of a telephone conversation and the second operating mode does not support telephone conversation, and the second operating mode is activated to replace the first operating mode when the telephone conversation is completed.

12. A mobile terminal, comprising:
one or more processors;
memory; and
one or more programs, wherein the one or more program modules are stored in the memory and configured to be executed by the one or more processors, the one or more program modules further including instructions for:
displaying a power usage switch condition configuration user interface;
predefining, according to configuration inputs by the user, a plurality of power usage switch conditions and respectively associated operating modes, including:
for a respective power usage switching condition, predefining a time criterion for switching to the respective power usage switching condition in accordance with the configuration inputs from the user; and
performing a user initiated conflict check on the respective power usage switching condition and a corresponding operating mode thereof against one or more pre-existing power usage switching conditions and corresponding operating modes thereof;
collecting operating environment information of the mobile terminal while the mobile terminal is in a first operating mode;
comparing the collected operating environment information with a plurality of power usage switch conditions, each power usage switch condition having an associated operating mode;
in accordance with a determination that the collected operating environment information matches one of the plurality of power usage switch conditions, determining a current working status of the mobile terminal;
in accordance with a determination that there is no conflict between the current working status of the mobile terminal and a second operating mode associated with the matched power usage switch condition, causing the mobile terminal to switch from the first operating mode to the second operating mode; and
in accordance with a determination that the current working status of the mobile terminal satisfies a predetermined exception for the matched power usage switch condition, operating the mobile terminal using a default mode that is predefined by a user and that is different from the first operating mode and the second operating mode.

13. The mobile terminal of claim 12, wherein the one or more program modules further include instructions for:
receiving a first configuration user instruction through the user interface, the first configuration user instruction specifying a start time and an end time for a respective power usage switch condition and a corresponding operating mode; and
saving the power usage switch condition and the corresponding operating mode in a first data structure in the memory.

14. The mobile terminal of claim 12, wherein the one or more program modules further include instructions for:
displaying an operating mode configuration user interface;
receiving a second configuration user instruction through the user interface, the second configuration user instruction including an operating mode and a corresponding set of operating parameters; and
saving the operating mode and the corresponding set of operating parameters in a second data structure.

15. The mobile terminal of claim 12, wherein the mobile terminal's operating environment information includes at least one of a current timestamp, a current location, a current network signal strength, and a current battery power level of the mobile terminal.

16. The mobile terminal of claim 12, wherein the mobile terminal's current working status indicates one or more application modules currently running on the mobile terminal.

17. The mobile terminal of claim 12, wherein the one or more program modules further include instructions for:
when there is a conflict between the mobile terminal's current working status and the second operating mode, deferring the switch from the first operating mode to the second operating mode until after detecting a predefined change to the mobile terminal's current working status.

18. A non-transitory computer readable storage medium storing one or more program modules, the one or more program modules further comprising instructions, which when executed by a mobile terminal, cause the mobile terminal to perform the following operations:
displaying a power usage switch condition configuration user interface;

predefining, according to configuration inputs by the user, a plurality of power usage switch conditions and respectively associated operating modes, including:
  for a respective power usage switching condition, predefining a time criterion for switching to the respective power usage switching condition in accordance with the configuration inputs from the user; and
  performing a user initiated conflict check on the respective power usage switching condition and a corresponding operating mode thereof against one or more pre-existing power usage switching conditions and corresponding operating modes thereof;
collecting operating environment information of the mobile terminal while the mobile terminal is in a first operating mode;
comparing the collected operating environment information with a plurality of power usage switch conditions, each power usage switch condition having an associated operating mode;
in accordance with a determination that the collected operating environment information matches one of the plurality of power usage switch conditions, determining a current working status of the mobile terminal; and
in accordance with a determination that there is no conflict between the current working status of the mobile terminal and a second operating mode associated with the matched power usage switch condition, causing the mobile terminal to switch from the first operating mode to the second operating mode; and
in accordance with a determination that the current working status of the mobile terminal satisfies a predetermined exception for the matched power usage switch condition, operating the mobile terminal using a default mode that is predefined by a user and that is different from the first operating mode and the second operating mode.

19. The non-transitory computer readable storage medium of claim 18, wherein the one or more program modules further include instructions for:
  receiving a first configuration user instruction through the user interface, the first configuration user instruction specifying a start time and an end time for a respective power usage switch condition and a corresponding operating mode; and
  saving the power usage switch condition and the corresponding operating mode in a first data structure in the memory.

20. The non-transitory computer readable storage medium of claim 18, wherein the one or more program modules further include instructions for:
  displaying an operating mode configuration user interface;
  receiving a second configuration user instruction through the user interface, the second configuration user instruction including an operating mode and a corresponding set of operating parameters; and
  saving the operating mode and the corresponding set of operating parameters in a second data structure.

21. The non-transitory computer readable storage medium of claim 18, wherein the mobile terminal's operating environment information includes at least one of a current timestamp, a current location, a current network signal strength, and a current battery power level of the mobile terminal.

22. The non-transitory computer readable storage medium of claim 18, wherein the mobile terminal's current working status indicates one or more application modules currently running on the mobile terminal.

23. The non-transitory computer readable storage medium of claim 18, wherein the one or more program modules further include instructions for:
  when there is a conflict between the mobile terminal's current working status and the second operating mode, deferring the switch from the first operating mode to the second operating mode until after detecting a predefined change to the mobile terminal's current working status.

* * * * *